US010401626B2

(12) United States Patent
Takagi et al.

(10) Patent No.: US 10,401,626 B2
(45) Date of Patent: Sep. 3, 2019

(54) IMAGE DISPLAY APPARATUS WITH LIGHT ADJUSTING MEMBERS

(71) Applicant: SEIKO EPSON CORPORATION, Tokyo (JP)

(72) Inventors: Masayuki Takagi, Matsumoto (JP); Takashi Takeda, Suwa (JP); Akira Komatsu, Tatsuno-machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/899,402

(22) Filed: Feb. 20, 2018

(65) Prior Publication Data
US 2018/0246327 A1 Aug. 30, 2018

(30) Foreign Application Priority Data

Feb. 27, 2017 (JP) .................. 2017-034472

(51) Int. Cl.
| G02B 27/01 | (2006.01) |
| G02B 27/02 | (2006.01) |
| G02B 27/22 | (2018.01) |
| G03B 35/16 | (2006.01) |
| G02F 1/1335 | (2006.01) |
| H04N 5/64 | (2006.01) |

(52) U.S. Cl.
CPC ....... *G02B 27/017* (2013.01); *G02B 27/0172* (2013.01); *G02B 27/02* (2013.01); *G02B 27/22* (2013.01); *G02F 1/1335* (2013.01); *G03B 35/16* (2013.01); *H04N 5/64* (2013.01); *G02B 2027/0132* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 2012/0200938 A1* | 8/2012 | Totani ................ G02B 27/0172 359/633 |
| 2013/0147859 A1* | 6/2013 | Kobayashi ............... G09G 5/10 345/690 |

FOREIGN PATENT DOCUMENTS

| JP | H07-36010 A | 2/1995 |
| JP | 3354008 A | 12/2002 |
| JP | 4268415 A | 9/2004 |
| JP | 2012-088472 A | 5/2012 |
| JP | 2013-020118 A | 1/2013 |

* cited by examiner

*Primary Examiner* — Gustavo Polo
(74) *Attorney, Agent, or Firm* — Oliff PLC

(57) ABSTRACT

An image display apparatus includes image displaying sections that present displayed images to a user and allow the user to visually recognize outside light, a first light adjusting member that is disposed on an outside-facing side of the image displaying sections and adjusts the transmittance based on outside light incident on the first light adjusting member, and a second light adjusting member that is disposed between the image displaying sections and the first light adjusting member and adjusts the transmittance in accordance with the transmittance of the first light adjusting member.

16 Claims, 10 Drawing Sheets

IMAGE DISPLAY APPARATUS WITH LIGHT ADJUSTING MEMBERS

BACKGROUND

1. Technical Field

The present invention relates to an image display apparatus that presents video images in the form of virtual images to a viewer.

2. Related Art

As an image display apparatus, such as a head mounted display (hereinafter also referred to as HMD) mounted on a viewer's head, what is called a see-through-type image display apparatus that superimposes video light and outside light on each other and allows the view to visually recognize the superimposed light has been known.

As an image display apparatus of the see-through type, there is a known image display apparatus provided with a light adjuster for adjusting the transmission state of the outside light to prevent a situation in which the visibility of video images lowers in a case where the outside light is too bright (see JP-A-2012-88472). The apparatus, in which an electrically controllable light adjusting member is disposed in a position outside the optical system, allows the viewer to readily view the video images by causing the light adjusting member to adequately adjust the outside light transmittance.

At present, however, since there is no light adjusting member or light adjusting element capable of electrically adjusting the transmittance with a wide transmittance variable range, an appropriate light adjusting member inevitably needs to be selected and used in accordance with the purpose. For example, in the case of TN liquid crystal, the transmittance adjustment range is about 0 to 45% because light passes through a polarizer. In the case of an electrochromic material, the transmittance adjustment range is still about 20 to 70% at the maximum in a practical electric power consumption situation. A see-through-type image display apparatus is conceivably used at a variety of locations, such as indoor and outdoor locations, but no relatively lightweight light adjusting member having a wide adjustment range appropriate for indoor and outdoor use exists at present.

SUMMARY

An advantage of some aspects of the invention is to provide an image display apparatus having a wide outside light transmittance adjustment range and hence useable under a variety of environments.

An image display apparatus according to an aspect of the invention includes an image displaying section that presents a displayed image to a user and allows the user to visually recognize outside light, a first light adjusting member that is disposed on an outside-facing side of the image displaying section and adjusts transmittance based on outside light incident on the first light adjusting member, and a second light adjusting member that is disposed between the image displaying section and the first light adjusting member and adjusts transmittance in accordance with a transmission state of the first light adjusting member.

In the image display apparatus described above, since the second light adjusting member is disposed in front of the image displaying section and the first light adjusting member is disposed in front of the second light adjusting member, and since the first light adjusting member adjusts the transmittance on the basis of the outside light and the transmittance of the second light adjusting member is adjusted in accordance with the transmission state of the first light adjusting member, the actions of the two light adjusting members can be coordinated with each other, whereby the overall transmittance can be adjusted over a wide range in accordance with the outside light in a variety of environments.

In a specific aspect of the invention, the first light adjusting member is made of a photochromic material, and the transmittance of the first light adjusting member changes when the first light adjusting member receives UV light. In this case, since the photochromic material itself operates in accordance with the intensity of the UV light incident thereon, a drive circuit for light adjustment can be simplified.

In another aspect of the invention, the first light adjusting member is so disposed as to be adjacent to the second light adjusting member and on an outside-facing side of the second light adjusting member. In this case, the first light adjusting member and the second light adjusting member are readily integrated with each other.

In still another aspect of the invention, the first light adjusting member and the second light adjusting member have transmittance adjustable ranges different from each other. In this case, the combination of the transmittance of the first light adjusting member and the transmittance of the second light adjusting member can achieve a new transmittance characteristic.

In still another aspect of the invention, the first light adjusting member is capable of adjusting the transmittance over a range wider than a range over which the second light adjusting member is capable of adjusting the transmittance. In this case, the burden on the second light adjusting member decreases, whereby the number of candidates of the second light adjusting member can be increased.

In still another aspect of the invention, the transmittance of the second light adjusting member is controlled based on an output from an outside light sensor. In this case, the outside light transmittance can be adjusted in accordance with the brightness of the outside, whereby the visibility of an outside image can be improved, and an image displayed by the image displaying section can be viewed with a background that changes by a relatively small amount, so that the displayed image is readily viewed.

In still another aspect of the invention, the transmittance of the second light adjusting member is controlled based on a signal for displaying an image to be displayed by the image displaying section. In this case, the outside light transmittance can be adjusted in accordance with the luminance or any other factor of the image to be displayed, whereby the visibility of the image displayed by the image displaying section can be improved.

In still another aspect of the invention, the outside light sensor is covered with the first light adjusting member, the transmittance of the first light adjusting member changes in accordance with an outside light environment, and the transmittance of the second light adjusting member is controlled based on a numeral into which brightness of outside light having passed through the first light adjusting member is converted. In this case, the second light adjusting member is allowed to operate in accordance with the brightness of the outside light having passed through the first light adjusting member, whereby the brightness of the outside light passing through the first and second light adjusting members can be adequately adjusted.

In still another aspect of the invention, the image display apparatus further includes a camera that captures an image of the outside and an outside light sensor that detects the outside light separately from the camera, and the outside light sensor and the camera are covered with the first light adjusting member. In this case, the brightness of the outside light having passed through the first light adjusting member can be checked by the outside light sensor for adjustment of the transmittance of the second light adjusting member, and the dynamic range that is the luminance range over which the camera can perform image capturing can be apparently widened.

In still another aspect of the invention, the image display apparatus further includes a camera that captures an image of the outside and an outside light sensor that detects the outside light separately from the camera, and only the outside light sensor is covered with the first light adjusting member. In this case, the brightness of the outside light having passed through the first light adjusting member can be checked by the outside light sensor for adjustment of the transmittance of the second light adjusting member.

Instill another aspect of the invention, the second light adjusting member is so disposed as to cover at least an image extraction area of the image displaying section. In this case, the luminance of the outside light, which serves as the background of an image displayed by the image displaying section, can be reliably adjusted.

Instill another aspect of the invention, the second light adjusting member is integrated with the first light adjusting member. In this case, the first and second light adjusting members are combined with each other into an integrated unit, which can be used as a light adjusting shade. The light adjusting shade may be attachable to and detachable from a body section including the image displaying section.

In still another aspect of the invention, the first light adjusting member is made of a photochromic material, and the second light adjusting member is bonded to the first light adjusting member.

In still another aspect of the invention, in a case where the image display apparatus is moved into a relatively dark environment, the image displaying section displays a state of the outside obtained by a camera that captures an image of the outside until transmittance response of each of the first and second light adjusting members is completed. In this case, observation of the outside at the dark location is readily performed even in the case where the first or second light adjusting member has a low response speed.

In still another aspect of the invention, the light adjustment state of at least one of the first and second light adjusting members is allowed to be changed by electronic control, and a wiring line for the electronic control is provided at least along a region outside an image extraction area of the image displaying section. In this case, a situation in which the wiring line is viewed in the image extraction area can be avoided, whereby a situation in which observation of the outside is hindered can be avoided, and degradation of an image displayed by the image displaying section due to the light adjusting members can be suppressed.

In still another aspect of the invention, at least one of the first and second light adjusting members is fixed to an attachment section on a side where the image displaying section is present, and the attachment section has a connection section that connects at least one of the first and second light adjusting members to a control section for the electronic control via the wiring line. In this case, the attachment section for the light adjusting members can be used to connect the wiring line, whereby the structure of mechanically and electrically attaching the light adjusting members to the body section including the image displaying section can be simplified.

In still another aspect of the invention, at least the first light adjusting member is so fixed to an attachment section on a side where the image displaying section is present as to entirely cover a field of view, and a connection section that connects the second light adjusting member to a control section for the electronic control via the wiring line is provided in a position of a frame section outside the image displaying section or a position around the frame section.

In still another aspect of the invention, the light adjustment state of at least one of the first and second light adjusting members is allowed to be changed by electronic control, and the light adjusting member capable of changing the light adjustment state is so set to have a high transmittance state when no drive signal is applied to the light adjusting member. Therefore, in a case where the first or second light adjusting member or an electronic control circuit that controls the light adjusting member does not operate due, for example, to failure, the transmittance of the light adjusting member increases, whereby a situation in which the failure or any other sporadic event prevents outside light observation can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An image display apparatus including light guiding members according to an embodiment of the invention will be described below in detail with reference to FIG. 1 and other figures.

Figure 1:
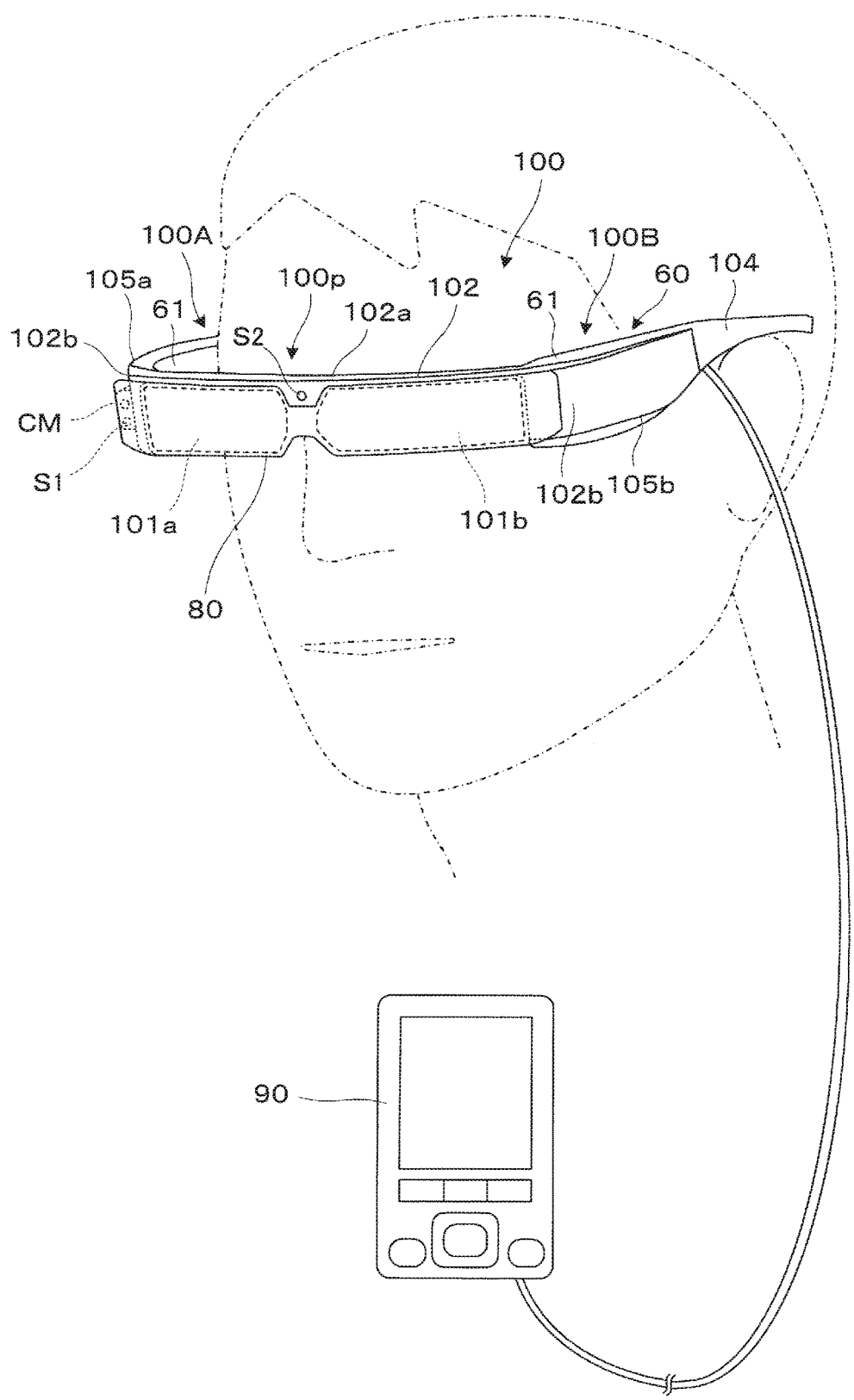
FIG. 1 is a perspective view for briefly describing the exterior appearance of an image display apparatus according to a first embodiment.
Figure 2:
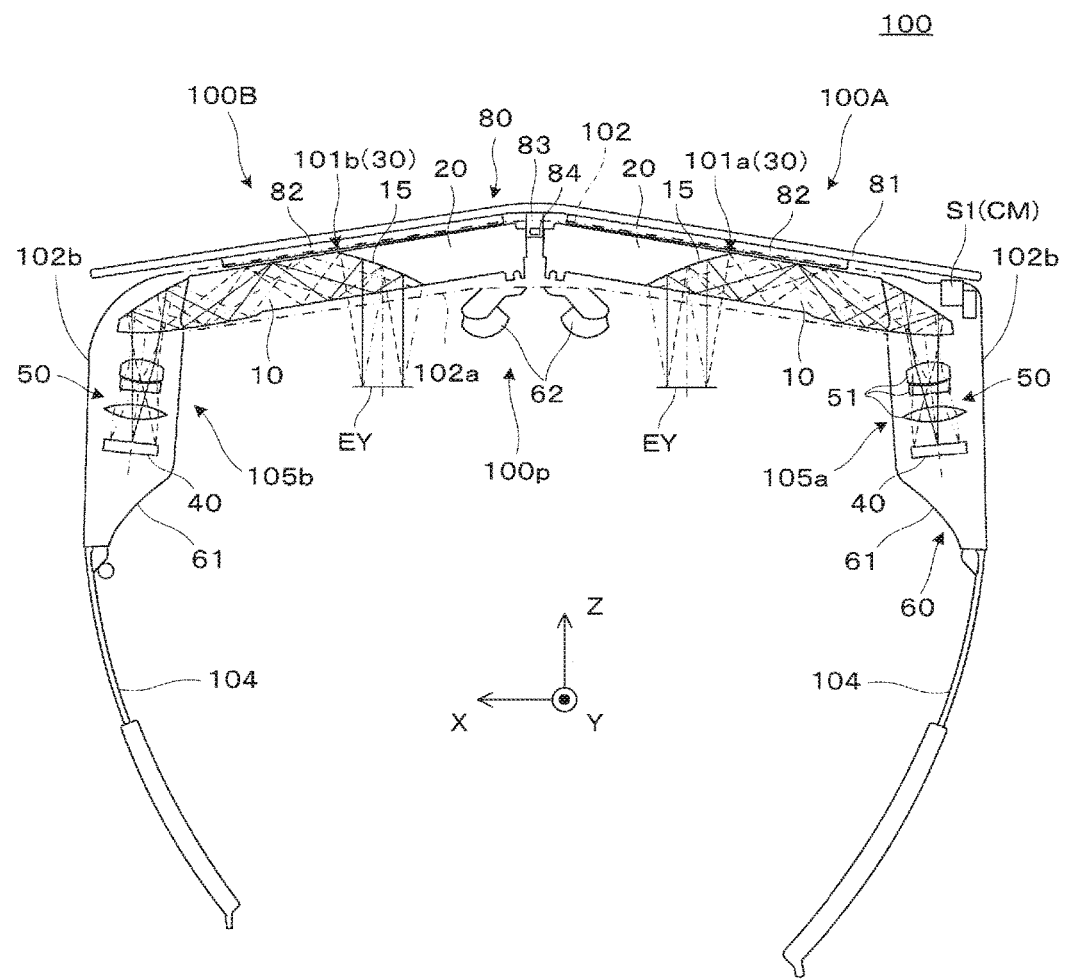
FIG. 2 is a conceptual plan view for describing the image display apparatus to which a light adjusting shade is attached.

An image display apparatus 100 according to the present embodiment is a head mounted display (HMD) having a glasses-like exterior appearance, allows a viewer or a user on whom the image display apparatus 100 is mounted to visually recognize image light (video light) in the form of a virtual image, and further allows the viewer to visually recognize or view an outside image in see-through observation, as shown in FIGS. 1 and 2. The image display apparatus 100 includes a first display apparatus 100A, a second display apparatus 100B, a frame section 102, a light adjusting shade 80, and a controller 90. The light adjusting shade 80, which is a light adjuster, is attachable to and detachable from a main body 100p, which is formed of the first and second display apparatus 100A, 100B and the frame section 102.

The first display apparatus 100A and the second display apparatus 100B are portions that form a virtual image for the right eye and a virtual image for the left eye, respectively, and include first and second image displaying sections 101a, 101b, which cover the front side of the viewer's eyes but allow see-through observation, and first and second image forming sections 105a, 105b, respectively. The first and second image forming sections 105a, 105b, which will be described later, are each formed of a video element, a projection lens, and other optical systems for image formation, a member that accommodates the optical systems, and other components. The first and second image displaying sections 101a, 101b guide video light formed by the first and second image forming sections 105a, 105b and allow the viewer or user to visually recognize outside light and the video light superimposed on each other. That is, the first and second image displaying sections 101a, 101b display images and present them to the viewer or user and allow the viewer or user to visually recognize outside light, which is light from the outside. The first image displaying section 101a or the second image displaying section 101b is also hereinafter called a light guiding apparatus 30. The first display apparatus 100A and the second display apparatus 100B each function as an image display apparatus by itself.

The frame section 102 includes a top plate section 102a and a pair of holding sections 102b. The top plate section 102a has the function of supporting the light guiding apparatus 30 and other components at the center of the image display apparatus, and the holding sections 102b function as an exterior member that accommodates the first and second image forming sections 105a, 105b in cooperation with cover members 61. The combination of the frame section 102 and the cover members 61 forms a support section 60, which supports the first and second image displaying sections 101a, 101b and the image forming sections 105a and 105b. Temples 104, each of which is a bow portion extending rearward, are provided at the ends of the holding sections 102b and can be used as portions that come into contact with the viewer's ears, temporal portions, or any other sites and support the image display apparatus. In addition, a nose pad section 62 (see FIG. 2), which comes into contact with the viewer's nose, is attached to a central portion of the top plate section 102a.

A camera CM and a first outside light sensor S1 are buried in and fixed to one of the holding sections 102b of the frame section 102. A second outside light sensor S2 is buried in and fixed to the top plate section 102a. In the state in which the light adjusting shade 80 is mounted on the main body 100p, the camera CM captures an image of the outside, particularly, a front region of the field of view through the light adjusting shade 80. In the state in which the light adjusting shade 80 is mounted on the main body 100p, the first outside light sensor S1 detects the illuminance in the outside, particularly, the illuminance in the front region of the field of view through the light adjusting shade 80. A variety of sensors for measuring the brightness in the outside can be used as the first outside light sensor S1, and the first outside light sensor S1 is formed, for example, of an ambient sensor as an illuminance sensor or a transmitted light illuminance sensor that measures the illuminance of outside light. The second outside light sensor S2 directly detects the illuminance in the outside, particularly, the illuminance in the front region of the field of view irrespective of the presence or absence of the light adjusting shade 80. The second outside light sensor S2 has the same structure as that of the first outside light sensor S1. The front region of the field of view associated with the outside light sensors S1 and S2 means the entirety or part of an outside region viewable with the eyes of the viewer on whom the image display apparatus 100 is mounted through the first and second image displaying sections 101a, 101b. The outside light sensors S1 and S2 do not necessarily each have a configuration using a device that outputs by itself a digital value and can instead have a configuration in which a device that outputs an analog value is used as each of the outside light sensors S1 and S2 and a digital value is provided by using an AD conversion function of a CPU, an IC, or any other component incorporated in a primary control section 190, which will be described later.

The first and second display apparatus 100A, 100B will be described below in detail with reference to FIG. 3. The two display apparatus 100A and 100B have the same optical function and are merely bilaterally reversed. Therefore, only the display apparatus 100A will be illustrated and described, and the second display apparatus 100B will not be illustrated or described.

Among the portions that form the first display apparatus 100A, the first image forming section 105a includes an image forming apparatus 40, which forms video light, and a projection lens 50, which outputs the image light (video light) to the first image displaying section 101a to project an image formed by the image forming apparatus 40.

The image forming apparatus 40 includes, for example, an organic EL panel or any other self-luminous video element. The image forming apparatus 40 can form an image by itself. The image forming apparatus 40 can instead be configured to include, for example, a video element that is an LCD panel or any other spatial modulator and an illuminator that is a backlight that outputs illumination light to the video element.

The projection lens 50 is a projection system, for example, including a plurality of optical elements arranged along the direction in which an optical axis AX extends, specifically, three lenses 51, and the optical elements are accommodated in and supported by an exterior member formed of the holding section 102b and the cover member 61 via a lens barrel portion (not shown). Part of the plurality of lenses 51 can be formed, for example, of an aspheric lens having a non-axially symmetric aspheric surface or an aspheric lens having an axially symmetric aspheric surface.

The light guiding apparatus 30, which is the first image displaying section 101a, is a prism-shaped member and is formed of a light guiding member 10 for light guidance and see-through observation and a light transmissive member 20 for see-through observation. Out of the two components described above, the light guiding member 10 is a monolithic prism-shaped or block-shaped member and can be considered as two separate portions, a light-exiting-side first light guiding section 11 and a light-incident-side second light guiding section 12. The light transmissive member 20 is an assistant optical block that assists the see-through observation function of the light guiding member 10, that is, a light transmissive portion, and is integrated with and fixed to the light guiding member 10 into one light guiding apparatus 30. The light guiding apparatus 30 is precisely positioned and fixed with respect to the projection lens 50, for example, by screw fastening, for example, via the lens barrel portion in the top plate section 102a, the holding section 102b, and the cover member 61 of the frame section 102.

The light guiding member 10 has first to fifth surfaces S11 to S15 as side surfaces each having an optical function. Among the surfaces, the first surface S11 and the fourth surface S14 are continuously adjacent to each other, and the third surface S13 and the fifth surface S15 are continuously adjacent to each other. The second surface S12 is disposed between the first surface S11 and the third surface S13. The surface of the second surface S12 is provided with and accompanied by a half-silvered mirror layer 15. The half-silvered mirror layer 15 is a reflection film having light transparency, that is, a semi-transmissive/semi-reflective film, is formed by depositing a metal reflection film or a dielectric multilayer film, and has appropriately set video light reflectance.

The light transmissive member 20 is integrated with and fixed to the light guiding member 10 into one light guiding apparatus 30 and is an assistant optical block that assists the see-through observation function of the light guiding member 10, as described above. The light transmissive member 20 has a first transmissive surface S21, a second transmissive surface S22, and a third transmissive surface S23 as side surfaces each having an optical function. The second transmissive surface S22 is disposed between the first transmissive surface S21 and the third transmissive surface S23. The first transmissive surface S21 is a surface that is an extension of the first surface S11 of the light guiding member 10, the second transmissive surface S21 is bonded to and integrated with the second surface S21, and the third transmissive surface S23 is a surface that is an extension of the third surface S13 of the light guiding member 10.

In the light guiding apparatus 30, the light guiding member 10 is bonded to the light transmissive member 20 via an adhesive layer CC, and the adhesive layer CC is present in a position shifted from the half-silvered mirror layer 15 toward the light transmissive member 20 in an image extraction area A1, where the half-silvered mirror layer 15 is present. The image extraction area A1 is a region from which the image light is outputted to the user's eye. The portion formed of the surface where the members 10 and 20 are bonded to each other and the adhesive layer CC is called a bonding section CN.

The surface of a body member 10s of the light guiding member 10 and the surface of a body member 20s of the light transmissive member 20 are covered and protected by a hard coat layer 27, which is a protective layer. The body members 10s and 20s are each made of a resin material having high light transparency in the visible region and molded, for example, by injecting a thermoplastic resin into a die and solidifying the thermoplastic resin. The hard coat layer 27 is formed as an outer layer surface by applying and depositing a coat liquid onto the body members 10s and 20s bonded to each other.

The optical path of video light GL will be described below with reference to FIG. 3. The video light GL formed by the image forming apparatus 40 is projected through the projection lens 50 toward the light guiding apparatus 30. Among the components that form the light guiding apparatus 30, the light guiding member 10 allows the video light GL to be incident thereon through the projection lens 50 and guides the video light GL toward the viewer's eye on the basis of reflection at the first to fifth surfaces S11 to S15 and other type of optical behavior. Specifically, the video light GL having passed through the projection lens 50 is incident on the fourth surface S14, reflected off the fifth surface S15, internally incident again on and totally reflected off the fourth surface S14, incident on and totally reflected off the third surface S13, and incident on and totally reflected off the first surface S11. The video light GL totally reflected off the first surface S11 is incident on the second surface S12 and partially reflected off the half-silvered mirror layer 15 provided on the second surface S12 while partially passing therethrough, is incident again on the first surface S11, and passes therethrough. The video light GL having passed through the first surface S11 is incident as a roughly parallel light flux on the viewer's eye EY or a position equivalent thereto. That is, the viewer views an image produced by the image light as a virtual image.

In the light guiding apparatus 30, since the third surface S13 and the first surface S11 are surfaces roughly parallel to each other, and the third transmissive surface S23 and the first transmissive surface S21 are surfaces roughly parallel to each other, the diopter acting on the outside light is roughly zero, and aberrations and other disadvantageous effects do not therefore occur. Further, since the third transmissive surface S23 and the first surface S21 are surfaces roughly parallel to each other, the outside light hardly suffer from aberrations and other disadvantageous effects. The viewer therefore views a distortion-free outside image. That is, see-through visual recognition or observation is achieved.

The light adjusting shade 80 is so disposed in a position close to the first image displaying section 101a as to cover the first image displaying section 101a or the light guiding apparatus 30. The light adjusting shade 80 includes a first light adjusting member 81, which is disposed on the outside facing side of the first image displaying section 101a, and a second light adjusting member 82, which is disposed between the first image displaying section 101a and the first light adjusting member 81. The first light adjusting member 81 adjusts the transmittance of the first light adjusting member 81 itself on the basis of the outside light incident thereon, and the second light adjusting member 82 adjusts the transmittance of the second light adjusting member 82 in accordance with the transmittance of the first light adjusting member 81. The first light adjusting member 81 changes the light adjustment state based not on electronic control but in a self-reliant manner, and the second light adjusting member 82 can change the light adjustment state based on electronic control. The first light adjusting member 81 and the second light adjusting member 82 differ from each other in size but are disposed adjacent to each other.

The first light adjusting member 81 is made of a photochromic material having light sensitivity that causes the transmittance to change when UV light or any other light is applied. The first light adjusting member 81 is formed of a substrate 81a having high transmittance, for example, close to 100% and having a uniform thickness and a photochromic layer 81b provided on the surface of the substrate 81a by applying a curable composition containing a photochromic compound. The first light adjusting member 81 can instead be made of a plastic material to which a photochromic compound is added. The first light adjusting member 81 blackens, that is, the transmittance of the first light adjusting member 81 decreases when the outside light has high illuminance but increases when the outside light has low illuminance. The transmittance of the first light adjusting member 81 can be changed over a range from about 15 to 80%. The first light adjusting member 81 has a relatively low response speed; the color developing response period is about 10 seconds, and the color fading period ranges from about several tens to several hundreds of seconds.

Figure 3:
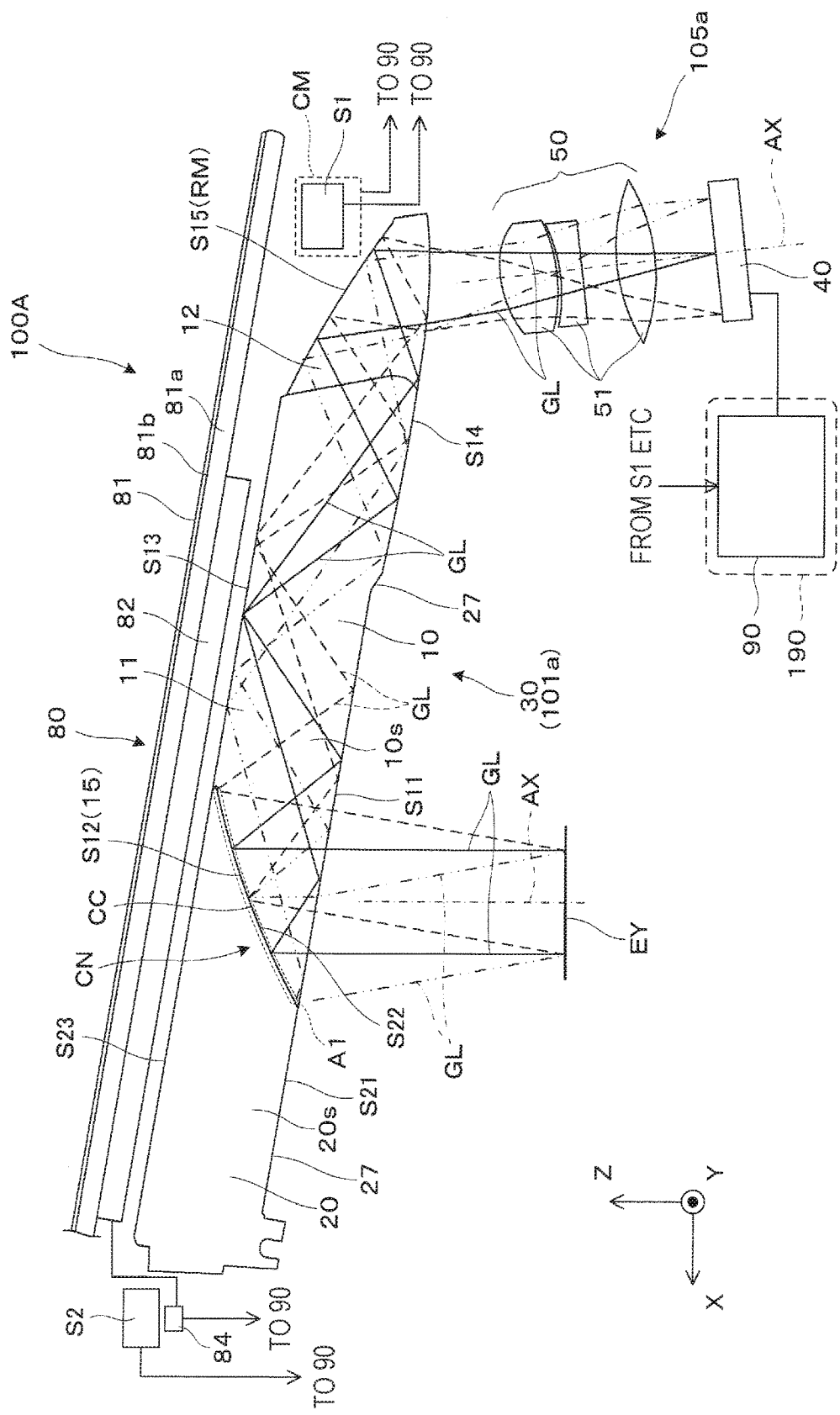
FIG. 3 is a partially enlarged cross-sectional view for describing an image displaying section and a light adjusting shade.
Figure 4A:
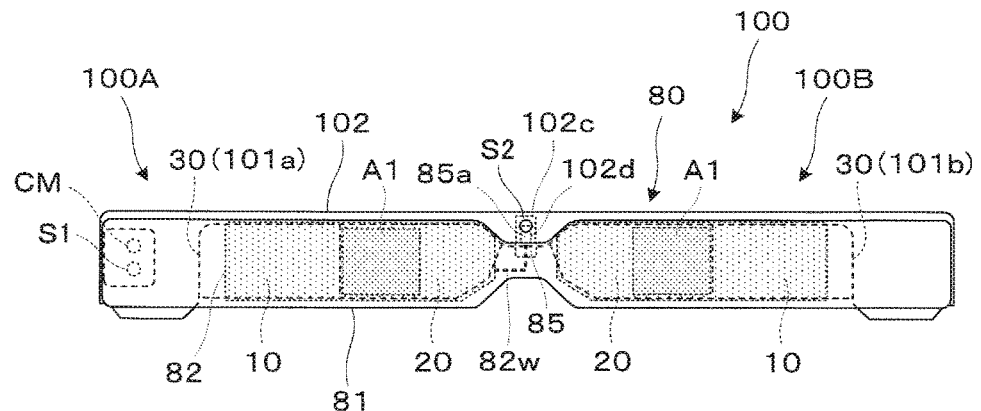
FIG. 4A is a front view of the image display apparatus to which the light adjusting shade is attached.
Figure 4B:
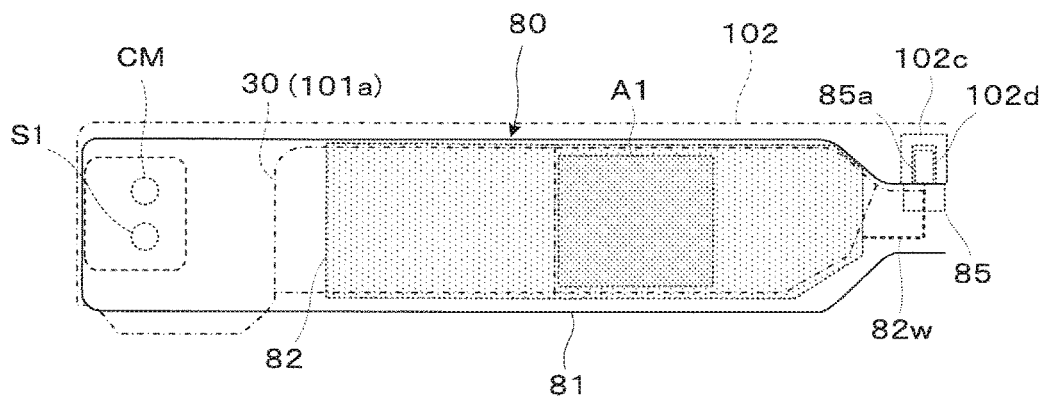
FIG. 4B is a partially enlarged front view of the image display apparatus to which the light adjusting shade is attached.

The first light adjusting member 81 is so disposed as to cover not only the first image displaying section 101a or the light guiding apparatus 30 but the first outside light sensor S1 and the camera CM (see FIGS. 3, 4A, and 4B). That is, the first outside light sensor S1 detects the illuminance in the outside, particularly, in the front region of the field of view through the first light adjusting member 81. The first light adjusting member 81 is, however, so disposed as to expose the second outside light sensor S2. The transmittance of the first light adjusting member 81 can therefore be calculated on the basis of the output from the first outside light sensor S1 and the output from the second outside light sensor S2.

The second light adjusting member 82 is a plate-shaped member and is bonded to and integrated with one side of the first light adjusting member 81 or the side facing of the first image displaying section 101a or the light guiding apparatus 30 with an adhesive. The second light adjusting member 82 is, for example, an electrochromic element. The second light adjusting member 82 has, for example, a structure in which a pair of flat glass plates having transparent electrodes formed on the inner surfaces thereof sandwich an electrochromic material or an electrolyte layer. The second light adjusting member 82, when it has a memorizing property, blackens, that is, the transmittance of the second light adjusting member 82 decreases when voltage having a specific polarity is applied across the pair of transparent electrodes, whereas the transmittance of the second light adjusting member 82 increases when voltage having the opposite polarity is applied across the pair of transparent electrodes. The transmittance of the second light adjusting member 82 can be changed over a range from about 15 to 70%. The second light adjusting member 82 performs light adjustment on the basis of electronic control and therefore has a response speed much higher than that of the first light adjusting member 81. In a case where the second light adjusting member 82 had no memorizing property, the second light adjusting member 82 desirably acts as a normally white light adjusting member. That is, the second light adjusting member 82, in a case where no drive signal is inputted thereto, has higher transmittance than in a case where a drive signal is inputted thereto. Therefore, in a case where the second light adjusting member 82 or an electronic control circuit that controls the second light adjusting member 82 does not operate due, for example, to failure, the transmittance of the second light adjusting member 82 increases, whereby a situation in which the failure or any other sporadic event prevents outside light observation can be avoided. Further, the configuration in which the second light adjusting member 82 acts as a normally white light adjusting member prevents obstruction of visual recognition of the outside even when no electric power is supplied to the second light adjusting member 82 for power saving in a case where no virtual image is displayed, for example, in a case where the display apparatus 100A and 100B operate in a standby mode.

The second light adjusting member 82 is so disposed as to nearly entirely cover the first image displaying section 101a or the light guiding apparatus 30 but so disposed as not to cover the first outside light sensor S1 (see FIGS. 3, 4A and 4B). That is, the first outside light sensor S1 is not affected by a change in the transmittance of the second light adjusting member 82. The second light adjusting member 82 is so disposed as to cover from the side facing the outside the image extraction area A1, where the half-silvered mirror layer 15 is present, in the light guiding apparatus 30.

In the example described above, the range over which the first light adjusting member 81 can adjust the transmittance differs from the range over which the second light adjusting member 82 can adjust the transmittance. The combination of the transmittance of the first light adjusting member 81 and the transmittance of the second light adjusting member 82 therefore achieves a new transmittance characteristic. Further, the transmittance adjustment range of the first light adjusting member 81 is wider than the transmittance adjustment range of the second light adjusting member 82. In this case, the burden on the second light adjusting member 82 decreases, whereby the second light adjusting member 82 can be an inexpensive component, and the number of candidates of the second light adjusting member 82 can be increased. The width of the transmittance adjustment range of each of the light adjusting members 81 and 82 is determined by the difference between the upper limit and the lower limit of the transmittance.

The second light adjusting member 82 is not limited to an electrochromic element and can instead be an element that can be electrically driven by voltage or current. For example, a guest host liquid crystal element can be used. A guest host liquid crystal element allows an increase in the response speed and a relative increase in the transmittance, for example, allows the transmittance to be changed over a range from about 30 to 70%. The second light adjusting member 82 can instead, for example, be an SPD (suspended particle device). An SPD allows the transmittance to be changed over a range, for example, from about 20 to 70%. An SPD blackens when it is not driven or no voltage is applied thereto and therefore acts only as a normally on element as the second light adjusting member 82. The second light adjusting member 82 can still instead be a gasochromic element. A gasochromic element allows the transmittance to be changed over a range, for example, from about 20 to 75%. The second light adjusting member 82 can still instead be a TN liquid crystal element. A TN liquid crystal element allows the transmittance to be changed over a range, for example, from about 0 to 45%. In addition, the second light adjusting member 82 can still instead be a polymer dispersed liquid crystal element. A polymer dispersed liquid crystal element allows the transmittance to increase to about 80% at the maximum but undesirably diffuses the outside light when the transmittance is decreased.

The second light adjusting member 82 is configured in principle to change the transmittance in the form of grayscales between the transparent state and an uncolored state close to black but can instead be, depending on the application, an element or a device that is colored when light incident thereon is blocked or passes therethrough.

The light adjusting shade 80 includes a fitting linkage section 85 in a central portion of the light adjusting shade 80, as shown in FIG. 4A and other figures. The light adjusting shade 80 is detachably fixed to an attachment section 102c, which is provided as part of the main body 100p or the frame section 102, which faces the image displaying sections 101a and 101b, via the fitting linkage section 85. The fitting linkage section 85 includes a pin-jack-shaped fitting protrusion 85a, and the attachment section 102c includes a hole-shaped connection section 102d, which receives the fitting protrusion 85a. The fitting protrusion 85a and the connection section 102d each have an electric contact, and a wiring line 82w, which extends from the second light adjusting member 82, is connected to the controller 90, which is a control section for the electronic control. The wiring line 82w is provided along a region outside the image extraction area A1. The wiring line 82w from the attachment section 102c extends via the frame section 102 to the second image forming section 105b in the second display apparatus 100B.

Figure 5A:
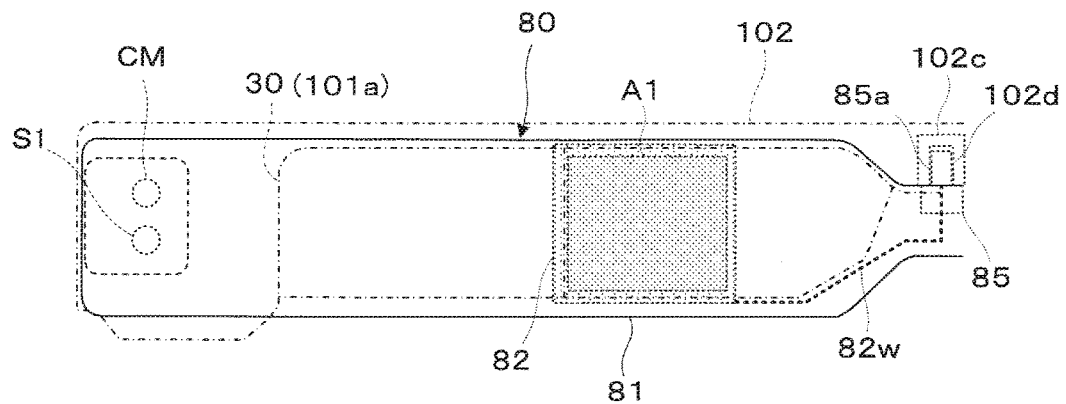
FIG. 5A describes a variation of the light adjusting shade.

FIG. 5A shows a variation of the light adjusting shade 80 shown in FIG. 4B and other figures. In the variation, the area of the second light adjusting member 82 is smaller than the area of the light adjusting member 82 of the embodiment described above. In this case, the second light adjusting member 82 has an area roughly equal to the image extraction area A1, where the half-silvered mirror layer 15 is present, in the light guiding apparatus 30 and covers the image extraction area A1 and a narrow portion therearound in a front view.

Figure 5B:
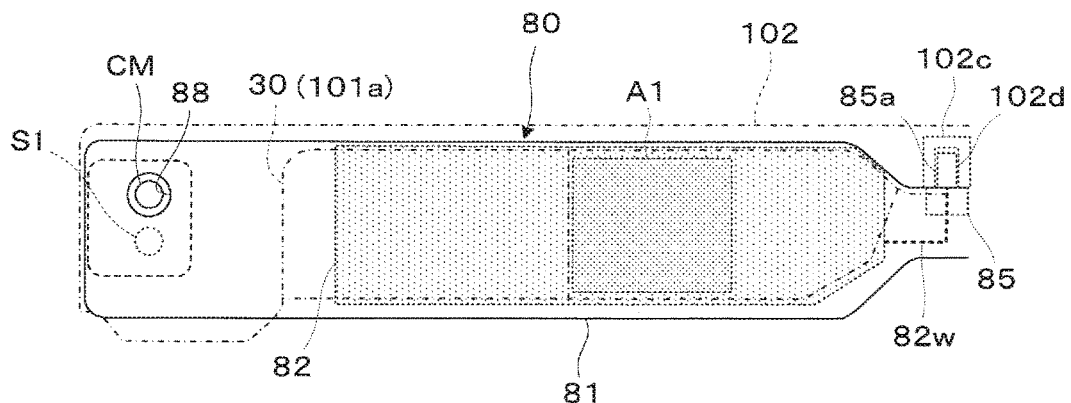
FIG. 5B describes another variation of the light adjusting shade.

FIG. 5B shows another variation of the light adjusting shade 80 shown in FIG. 4B and other figures. In the variation, an opening 88 is formed in part of the first light adjusting member 81. In this case, only the first outside light sensor S1 is covered with the first light adjusting member 81, and the camera CM is exposed to the outside through the opening 88, whereby the camera CM can capture an image of the outside with no interference with the light adjusting shade 80.

Although not shown, the connection section 102d for the light adjusting shade 80 is not necessarily formed in the central portion of the main body 100p or the frame section 102 for support purposes, as shown in the drawings, and can instead be formed, for example, in a peripheral portion of the frame section 102 (support section 60, for example).

Figure 6:
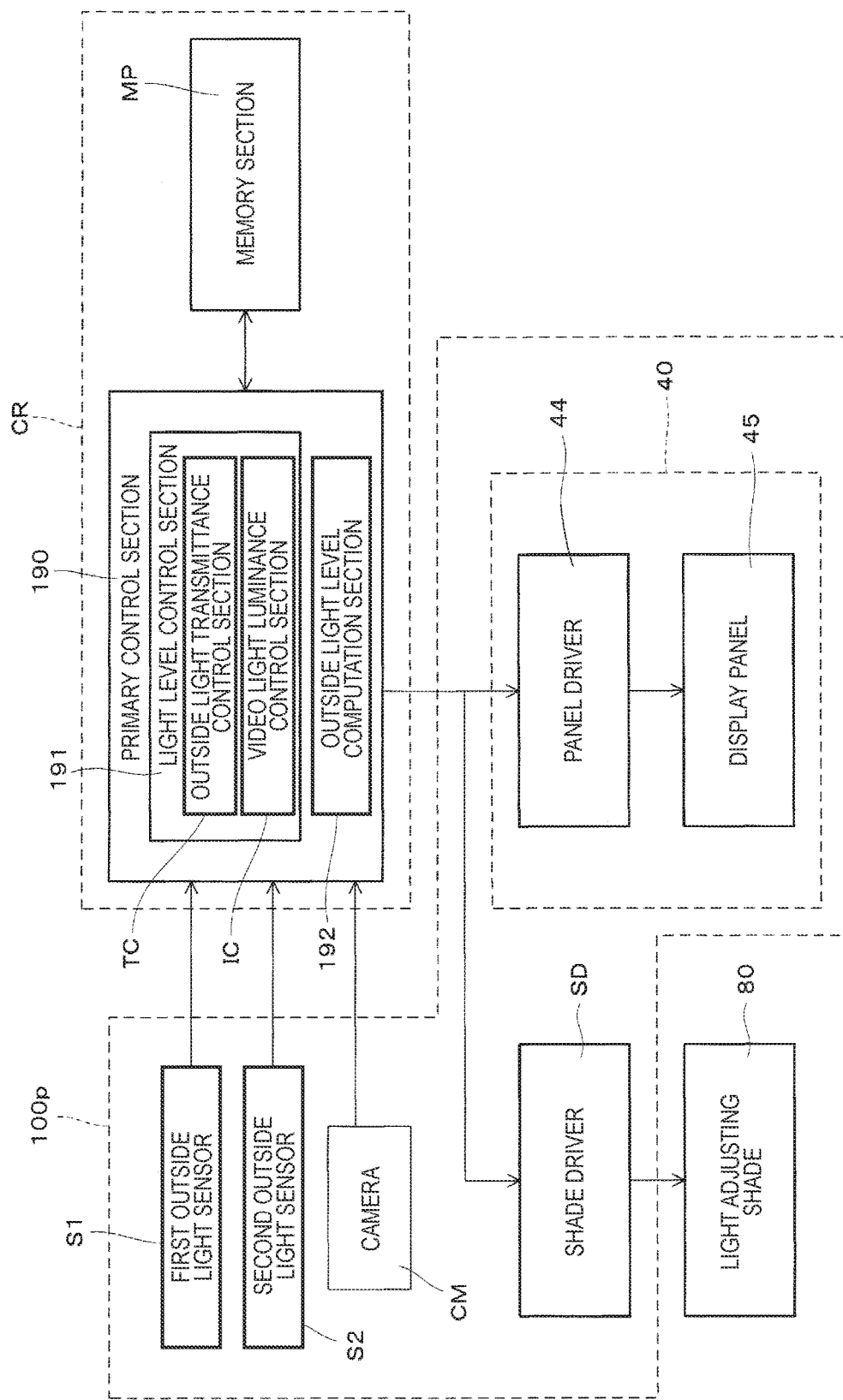
FIG. 6 is a block diagram for describing an example of the control system of the image display apparatus.

The control system of the image display apparatus 100 will be described with reference to FIG. 6. The main body 100p of the image display apparatus 100 includes a panel driver 44 and a display panel 45 as each of the image forming apparatus 40. Out of the pair of right and left image forming apparatus 40, only one of them is shown in FIG. 6. The main body 100p also includes a built-in shade driver SD for the light adjusting shade 80.

A controller CR includes not only the primary control section 190, which is responsible for a variety of types of control action of the image display apparatus 100, but a memory section MP, an input apparatus (not shown) that is formed of a button section and a touch panel section that allow the viewer to perform a variety of types of operation and accepts the viewer's operation instruction, and other components.

The primary control section 190 performs a variety of types of control by controlling the action of each portion that forms the controller CR and transmitting and receiving signals to and from the image forming apparatus 40, the light adjusting shade 80, and other components attached to the main body 100p and connected to the primary control section 190 to oversee the entire video light control. The primary control section 190 includes a light level control section 191 and an outside light level computation section 192 for monitoring results of the detection performed by the first outside light sensor S1 and the second outside light sensor S2 and performing light level control action according to a change in the outside light. The light level control section 191 includes an outside light transmittance control section TC, which performs the action of controlling the transmittance adjustment in the light adjusting shade 80, and a video light luminance control section IC, which performs the action of controlling video light luminance adjustment. The light level control section 191 performs computation relating to the outside light level on the basis of information acquired by the outside light level computation section 192 to perform necessary light level control on the basis of a result of the computation. In the present embodiment, the outside light transmittance control section TC, which forms the light level control section 191, adjusts the transmittance of the light adjusting shade 80.

The memory section MP stores a variety of programs necessary for the video control controlled by the primary control section 190 and a variety of data, such as image data.

In the present embodiment, a description will be made as an action example a case where an outside light priority mode in which priority is placed on outside light control and a video light priority mode (image light priority mode) in which priority is placed on video light control can be switched from one to the other. As a more specific aspect of the outside light priority mode, it is conceivable to place priority on the outside light control or management, for example, by performing action control in which the outside light transmittance of the entire display section is increased and decreased, for example, by the light adjusting shade 80, that is, performing transmittance control. As for the video light priority mode, it is conceivable to place priority on the video light control or management by performing action control in which the video light luminance over the entire display section is increased and decreased, that is, performing display ratio control.

To adjust the transmittance of the light adjusting shade 80, the first light adjusting member 81 serves to reduce a change in the illuminance of the outside light, and the second light adjusting member 82 is operated to assist the first light adjusting member 81 in such a way that the second light adjusting member 82 further reduces the change in the illuminance of the outside light. Provided that the action described above is performed, to determine the transmittance of the second light adjusting member 82, which is an adjustable component among the components that form the light adjusting shade 80, it is typically conceivable to use a function or a table uniquely determined by an output value, for example, from the first outside light sensor S1 (that is, brightness of outside light having passed through first light adjusting member 81). However, for example, in a situation in which a large number of fluorescent lamps are present in the user's visual field or in a situation in which a large number of objects having brightness values greatly different from one another, such as the sky, a mountain, and the ground, are present in the outdoor environment, the light adjusting shade 80 needs to hastily change the transmittance whenever the visual field direction changes, resulting in a cumbersome reaction for the user. It is therefore conceivable to employ a method for accumulating an output value, for example, from the first outside light sensor S1 in a memory for the past sub-seconds to several seconds, deriving the moving average of the values representing changes in the light level, and using the moving average to determine the transmittance of the light adjusting shade 80 or the second light adjusting member 82. In the description, the control based on the moving average of the outside illuminance is called normal light level control.

The light adjustment action performed by the primary control section 190 will be specifically described. When the light level measured with the first outside light sensor S1 (that is, brightness of outside light having passed through first light adjusting member 81) abruptly decreases or increases, the primary control section 190 functions in a control mode different from the typical control mode. In this case, particularly when the illuminance measured with the first outside light sensor S1 abruptly decreases, that is, when the visual field through the first light adjusting member 81 abruptly darkens, the video light dominates and blocks the visual field so that the viewer is highly likely to be unable to recognize the situation in the visual field. To avoid the situation, an acceleration filter (hereinafter also referred to as filter A) weighted as compared with a moving average filter or a transmittance adjustment pattern (hereinafter also referred to as filter B) corresponding to the normal light level control is used to improve the responsiveness of the light adjusting shade 80 and instantaneously change the transmittance of the light adjusting shade 80 in such a way that the transmittance increases. On the other hand, when the illuminance measured with the first outside light sensor S1 abruptly increases, that is, when the brightness of the visual field through the first light adjusting member 81 abruptly increases, the visual field is seen more clearly than the video light, and a safety problem guaranteed not to occur in the specifications is therefore conceivably unlikely to occur. A deceleration filter (hereinafter also referred to as filter C) less-weighted by setting the responsiveness to be equal to or lower than the responsiveness provided by the moving average filter, that is, the filter B described above corresponding to the normal light level control is therefore used to gradually change the transmittance of the light adjusting shade 80 appropriate for the brightness of the outside light.

An example of the transmittance-control-related action performed by the light adjusting shade 80 will be described below with reference to the flowchart of FIG. 7.

When the image display apparatus 100 starts operating, the primary control section 190 first checks whether or not the light adjusting shade 80 has been attached (step S101). Having checked in step S101 that the light adjusting shade 80 had been attached (Y in step S101), the primary control section 190 checks whether the current action environment corresponds to the outside light priority mode or not (video light priority mode) (step S102). Having checked in step S102 that the current action environment corresponds to the outside light priority mode (Y in step S102), the primary control section 190 reads an illuminance value L(t) measured and converted into a numeral by the first outside light sensor S1 (step S103) and calculates ΔL(t)=L(t)−L(t−Δt), which is the amount of change in the value L(T) in Δt seconds (step S104). Further, in step S104, the primary control section 190 reads a threshold Lc (>0), which is a value specified in advance, and compares the calculated value ΔL(t) with the threshold Lc. In a case where the value ΔL(t) is smaller than the threshold Lc multiplied by −1, the primary control section 190 calculates a transmittance setting value based on the filter A and to be set at the transmittance of the second light adjusting member 82 and performs the transmittance adjustment (step S105a). That is, the primary control section 190 determines that the light level of the outside light through the first light adjusting member 81 has abruptly decreased from the value measured with the first outside light sensor S1 and performs instantaneous control. In a case where the value ΔL(t) is greater than the threshold Lc multiplied by −1 but smaller than the threshold Lc (absolute value of ΔL(t) is smaller than threshold Lc), the primary control section 190 calculates a transmittance setting value based on the filter B and to be set as the transmittance of the second light adjusting member 82 and performs the transmittance adjustment (step S105b). That is, the primary control section 190 determines that the light level of the outside light through the first light adjusting member 81 has not abruptly changed from the value measured with the first outside light sensor S1 and performs the normal light level control. In a case where the value ΔL(t) is greater than the threshold Lc, the primary control section 190 calculates a transmittance setting value based on the filter C and to be set as the transmittance of the second light adjusting member 82 and performs the transmittance adjustment (step S105c). That is, the primary control section 190 determines that the light level of the outside light through the first light adjusting member 81 has abruptly increased from the value measured with the first outside light sensor S1 and performs delay control.

Performing the calculation and control in any of the steps S105a to S105c allows adjustment of the transmittance of the light adjusting shade 80 or the second light adjusting member 82 in the image display apparatus 100, and the actions in step S101 and the following steps are repeated.

Among the steps described above, having checked in step S102 that the outside light priority mode has not been set (The video light priority mode is set) (N in step S102), the primary control section 190 does not acquire information, for example, from the first outside light sensor S1 but carries out the process of setting the transmittance of the second light adjusting member 82 at a fixed value (step S106), checks whether or not the light adjusting shade 80 is present (step S107) and whether or not the priority mode has been changed (step S108), and continuously keeps the transmittance of the second light adjusting member 82 fixed in the process in step S105 as long as it is determined that the light adjusting shade is present (Y in step S107) and the priority mode is the video light priority mode (N in step S108). On the other hand, having determined in step S108 that the priority mode has been changed (priority mode have been changed to outside light priority mode) (Y in step S108), the primary control section 190 returns to step S101 and starts the actions described above again. The primary control section 190 continuously performs the actions described above until the primary control section 190 checks in step S101 or S107 that the light adjusting shade 80 has been detached (N in step S101 or N in step S107).

As a summary of the action control described above, the primary control section 190 performs the instantaneous control in a case where the following condition is satisfied: a decrease in the outside light level in a predetermined period (Δt seconds) is greater than a predetermined value (outside light level decreases beyond threshold Lc), performs the delay control in a case where the following condition is satisfied: an increase in the outside light level in the predetermined period (Δt seconds) is greater than the predetermined value (threshold Lc), and, in a case where neither of the conditions described above is satisfied, controls the transmittance of the light adjusting shade 80 or the second light adjusting member 82 on the basis of the normal moving average (performs normal light level control).

As described above, in the image display apparatus 100 according to the present embodiment, since the second light adjusting member 82 is disposed in front of the image displaying sections 101a and 101b and the first light adjusting member 81 is disposed in front of the second light adjusting member 82, and since the first light adjusting member 81 adjusts the transmittance on the basis of the outside light and the transmittance of the second light adjusting member 82 is adjusted in accordance with the transmittance of the first light adjusting member 81, the actions of the two light adjusting members 81 and 82 can be coordinated with each other, whereby the overall transmittance can be adjusted over a wide range in accordance with the outside light in a variety of environments.

Second Embodiment

An image display apparatus according to a second embodiment will be described below. The present embodiment is a variation of the image display apparatus according to the first embodiment, and the same portions as those in the first embodiment will not be described.

Figure 8:
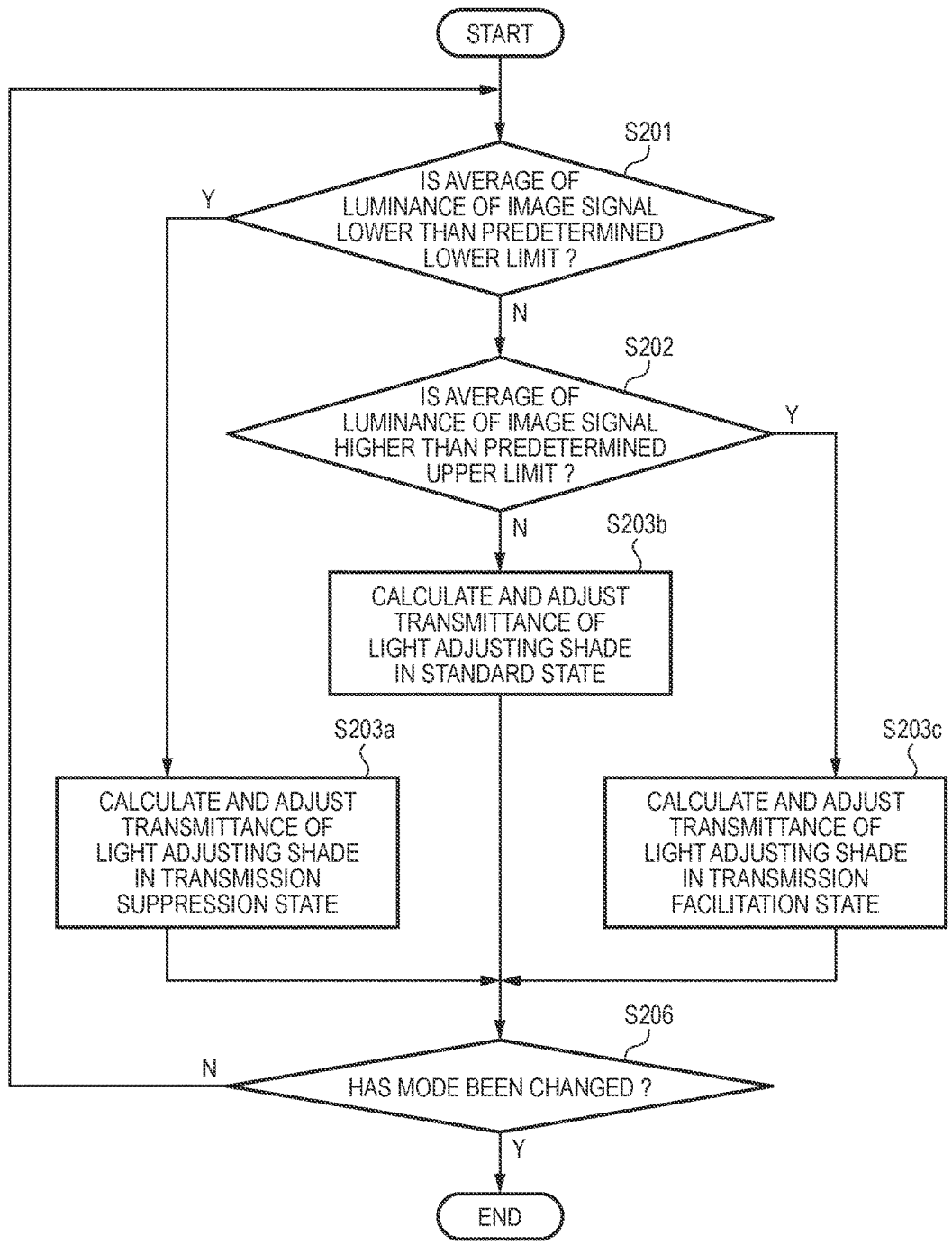
FIG. 8 is a flowchart for describing the action of an image display apparatus according to a second embodiment.

FIG. 8 is a flowchart for describing the action of the image display apparatus according to the present embodiment. In this case, unlike the first embodiment, the transmittance of the second light adjusting member 82 is not controlled on the basis, for example, of the output from the first outside light sensor S1, but the transmittance of the second light adjusting member 82 is controlled on the basis of a signal for displaying an image displayed by each of the image displaying sections 101a and 101b.

In the action shown in FIG. 8, it is assumed that a mode in which the transmittance of the second light adjusting member 82 is controlled on the basis of an image display signal outputted from the primary control section 190 to the image forming apparatus 40 is set. The primary control section 190 evaluates whether or not the average of the luminance of an image stored in the memory section MP and formed by the image forming apparatus 40 is lower than a predetermined lower limit (step S201). The image formed by the image forming apparatus 40 includes motion images and other images. The primary control section 190, when it determines that the average of the luminance of the image is higher than or equal to the predetermined lower limit (N in step S201), evaluates whether or not the average of the luminance of the image formed by the image forming apparatus 40 is higher than a predetermined upper limit (step S202). The primary control section 190, when it determines that the average of the luminance of the image is lower than or equal to the predetermined upper limit (N in step S202), calculates a transmittance setting value to be set as the transmittance of the second light adjusting member 82 in a standard state and performs the transmittance adjustment (step S203b). To set the transmittance of the second light adjusting member 82 to a value in the standard state, the control in steps 105a to 105c in the first embodiment can, for example, be performed, but not necessarily. The primary control section 190, when it determines that the average of the luminance of the image is lower than the predetermined lower limit (Y in step S201), calculates a transmittance setting value to be set as the transmittance of the second light adjusting member 82 in a transmission suppression state and performs the transmittance adjustment (step S203a). In this case, it is conceivable that the luminance of the image to be displayed is relatively low and the viewer's tendency toward difficulty in viewing still images or video images increases. The primary control section 190 therefore sets the transmittance of the second light adjusting member 82 at a small value. In this case, it is possible to carry out the process of decreasing the transmittance of the second light adjusting member 82 in accordance with the magnitude of the difference from the aforementioned predetermined lower limit of the average of the luminance of the image. The action of decreasing the transmittance of the second light adjusting member 82 can be accompanied by reduction in or delay of the change in the transmittance by using the method described in the first embodiment. The primary control section 190, when it determines that the average of the luminance of the image is higher than the predetermined upper limit (Y in step S202), calculates a transmittance setting value to be set as the transmittance of the second light adjusting member 82 in a transmission facilitation state and performs the transmittance adjustment (step S203c). In this case, it is conceivable that the luminance of the image to be displayed is relatively high and the viewer's tendency toward difficulty in viewing the outside increases. The primary control section 190 therefore sets the transmittance of the second light adjusting member 82 at a large value. In this case, it is possible to carry out the process of increasing the transmittance of the second light adjusting member 82 in accordance with the magnitude of the difference from the aforementioned predetermined upper limit of the average of the luminance of the image. The action of increasing the transmittance of the second light adjusting member 82 can be accompanied by reduction in or delay of the change in the transmittance by using the method described in the first embodiment.

Figure 9:
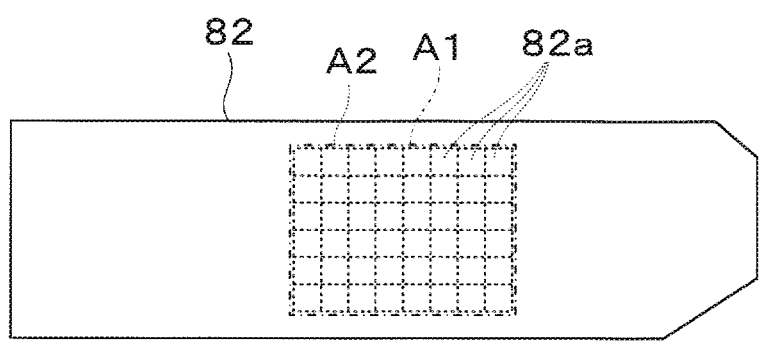
FIG. 9 describes a variation of a second light adjusting member.

In the above description, the transmittance of the second light adjusting member 82 is increased or decreased on the basis of the average of the luminance of an image formed by the image forming apparatus 40. Instead, the transmittance of the second light adjusting member 82 may be set, that is, increased or decreased with respect to the average chroma of the image. That is, in a case where the chroma of an image is low, a portion displayed in an achromatic color (black, in particular) is likely to be seen as a transparent portion in the see-through display sections, and it is therefore possible to carry out the process of decreasing the transmittance of the second light adjusting member 82 in the case of an image having low chroma. Further, it is not necessary to calculate the average of the luminance of an entire image formed by the image forming apparatus 40 and set the transmittance of the overall second light adjusting member 82. Instead, a display area A2 corresponding to the image extraction area A1 out of the second light adjusting member 82 can be divided into a plurality of regions 82a, as shown in FIG. 9, and the transmittance of each of the regions can be individually controlled. In this case, an image formed by the image forming apparatus 40 is handled as image regions corresponding to the plurality of regions 82a of the second light adjusting member 82, the average luminance or any other value is calculated of each of the image regions, and the transmittance can be set for each of the plurality of regions 82a of the second light adjusting member 82 that correspond to the image regions. The plurality of regions 82a are not limited to those shown in FIG. 9, and the display area A2 can be divided into arbitrary N×M (N and M are each natural number) regions arranged in a matrix or a lattice. Further, the plurality of regions 82a do not necessarily have the same shape but can have shapes, areas, and other factors different from one another, that is, can have any of a variety of shapes other than a rectangular shape.

The processes described above, that is, the actions in step S201 and the following steps are repeated unless the mode is changed (N in step S206).

In the image display apparatus 100 according to the second embodiment, since the transmittance of the second light adjusting member 82 is controlled on the basis of a signal for displaying image displayed by the image displaying sections 101a and 101b, the outside light transmittance of the second light adjusting member 82 or any other portion can be adjusted in accordance with the luminance or any other factor of the image to be displayed, whereby the visibility of the image displayed by each of the image displaying sections 101a and 101b can be improved.

Third Embodiment

An image display apparatus according to a third embodiment will be described below. The present embodiment is a variation of the image display apparatus according to the first embodiment, and the same portions as those in the first embodiment will not be described.

Figure 7:
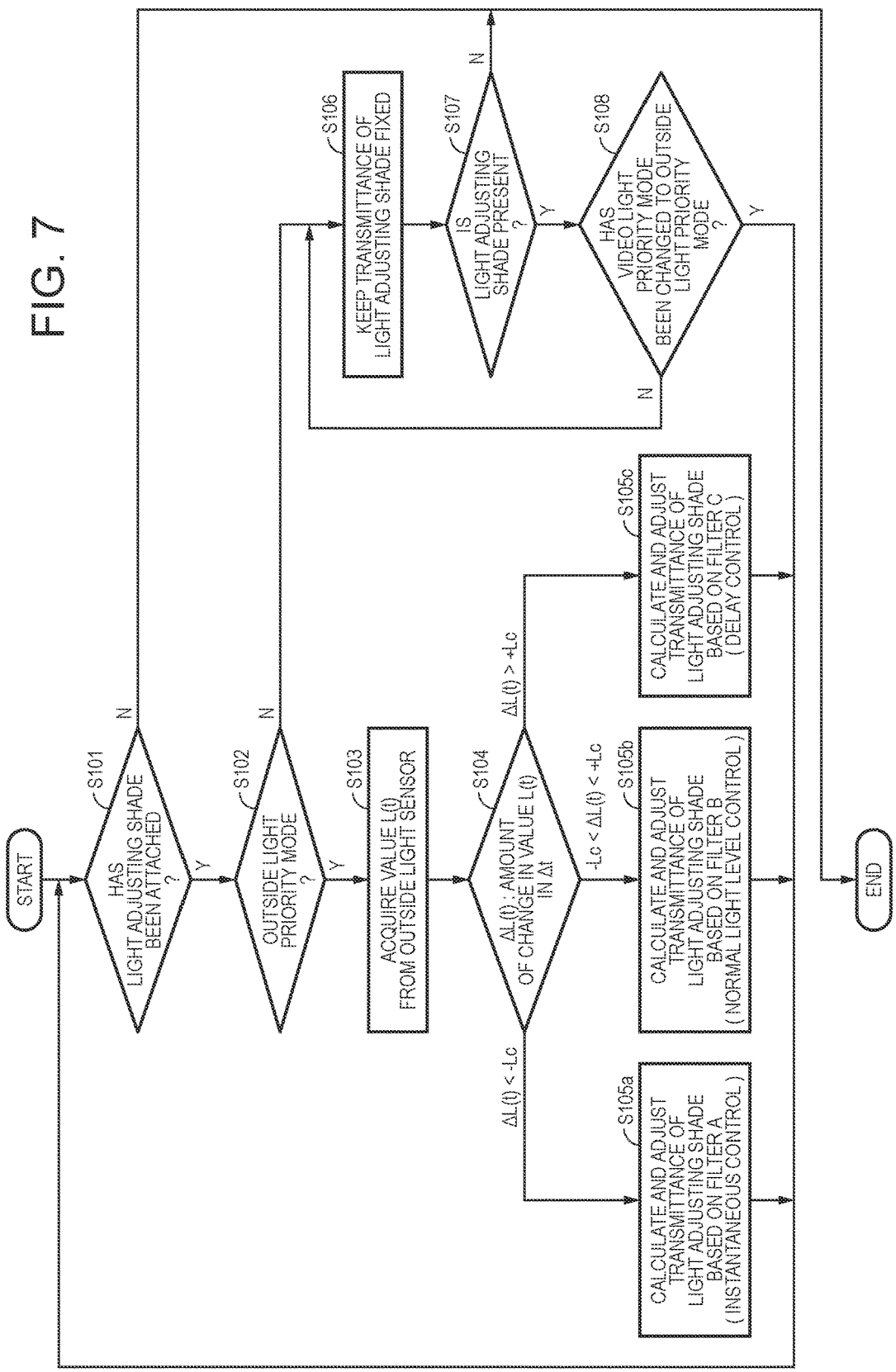
FIG. 7 is a flowchart for describing an example of control of transmittance of the light adjusting shade.
Figure 10:
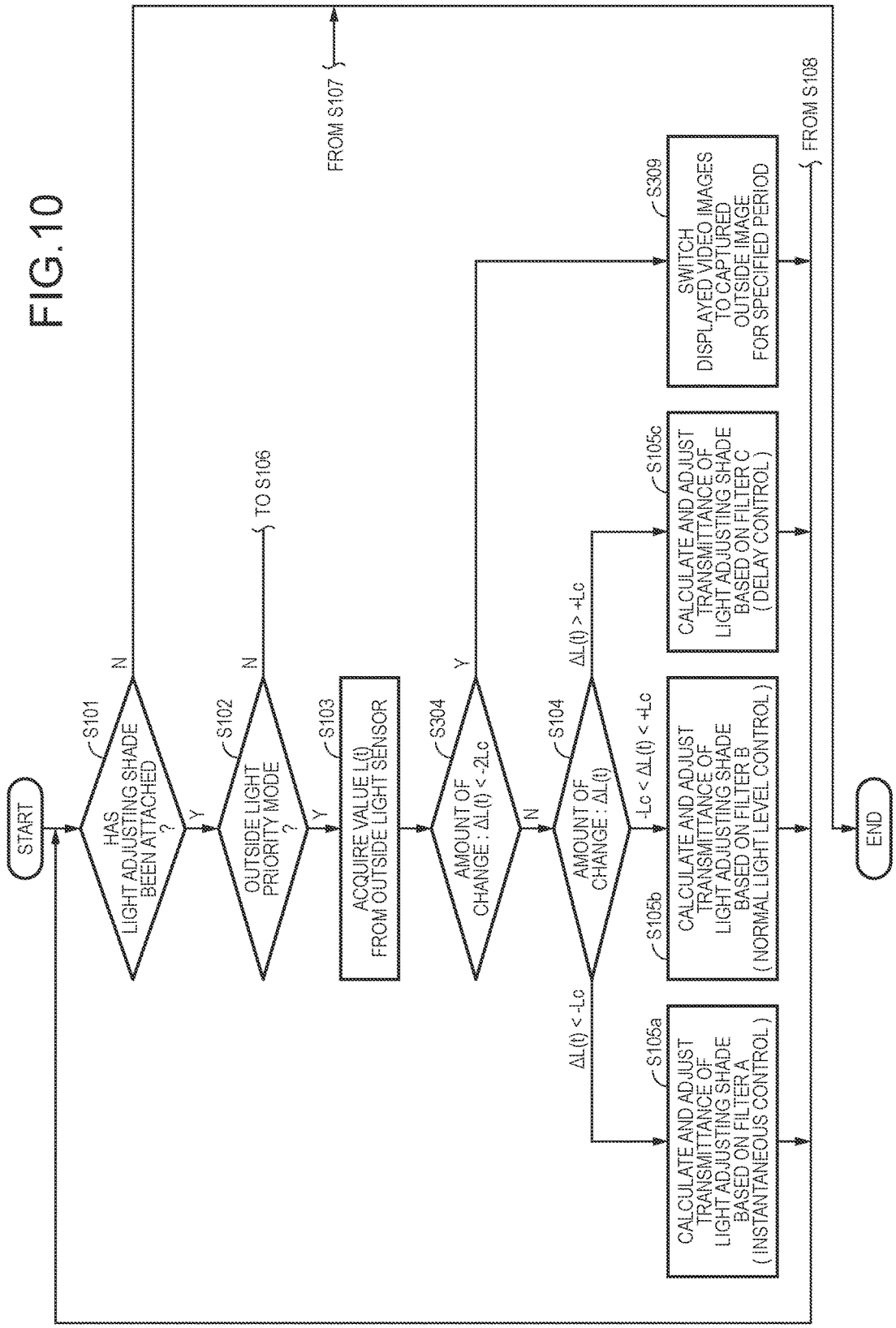
FIG. 10 is a flowchart for describing the action of an image display apparatus according to a third embodiment.

FIG. 10 is a flowchart for describing the action of the image display apparatus according to the present embodiment and is a partially changed version of the flowchart of FIG. 7. In this case, the transmittance of the second light adjusting member 82 is controlled on the basis of the output, for example, from the first outside light sensor S1, as in the first embodiment. However, in a case where the illuminance value L(t) measured with the first outside light sensor S1 decreases by an extremely large amount, video images or still images displayed by the first and second image displaying sections 101a, 101b are switched to an outside image captured with the camera CM for an emergency handling period set in consideration of the responsiveness of the first light adjusting member 81. That is, the image display apparatus 100, when it is moved into an environment where the brightness abruptly relatively lowers, for example, when the image display apparatus 100 is abruptly moved to a dark location, operates the primary control section 190 appropriately, whereby the first and second image displaying sections 101a, 101b display the state of the outside captured with the camera CM, which captures an image of the outside, until the transmittance response of the first light adjusting member 81 is completed. The state of the outside captured with the camera CM is not limited to a state representing the exact state of the outside but can, for example, be an enlarged or reduced image of the outside or a state of the outside in which the luminance, the color, or any other factor thereof is processed.

In the action shown in FIG. 10, the primary control section 190 calculates the amount of change in the illuminance value L(t), $\Delta L(t) = L(t) - L(t-\Delta t)$ measured and converted into a numeral by the first outside light sensor S1 (step S304). In a case where the value $\Delta L(t)$ is smaller than an emergency handing reference value $-2Lc$ (Y in step S304), the primary control section 190 switches video images displayed by the first and second image displaying sections 101a, 101b to an outside image captured with the camera CM (step S309). The period for which the displayed video images are switched to the outside image captured with the camera CM is set in consideration of the responsiveness of the first light adjusting member 81. In the case where a photochromic element, in which, it takes for example, about several tens of seconds to several minutes for color fading, is used as the first light adjusting member 81, the emergency handling period, for which the outside image captured with the camera CM is displayed, is set to be roughly equal to the color facing period. Since the transmittance of the first light adjusting member 81 can be determined in a case where the outputs from both the first and second outside light sensors S1, S2 are detected, the following control is also conceivable: An outside image captured with the camera CM is displayed until the transmittance of the first light adjusting member 81 is recovered to an acceptable value, for example, 50%; and after the transmittance of the first light adjusting member 81 is recovered to the acceptable value, the outside image captured with the camera CM is replaced with the original image viewed before the outside image is displayed.

In the above description, the emergency handling reference value is set at $-2Lc$, which is, however, presented only by way of example, and the emergency handling reference value can be set at an appropriate value including a safety margin.

In the above description, evaluation of whether or not displayed video images are switched to an outside image captured with the camera CM is made on the basis of the amount of change in the illuminance $\Delta L(t)$ measured with the first outside light sensor S1, but the evaluation can instead be made on the basis the transmittance of the first light adjusting member 81. That is, in a case where the transmittance of the first light adjusting member 81 is calculated on the basis of the outputs from the first and second outside light sensors S1, S2 and the calculated transmittance is extremely low as compared with a result of detection of the illuminance of the outside light performed by the second outside light sensor S2, displayed video images can be switched to an outside image captured with the camera CM.

Still instead, displayed video images can be switched to an outside image captured with the camera CM on the basis of the illuminance itself of the outside detected with the second outside light sensor S2 in place of the amount of change in the illuminance $\Delta L(t)$.

The timing when video images displayed by the first and second image displaying sections 101a, 101b are switched to an outside image captured with the camera CM, that is, the timing of switching to a video see-through mode can be the timing when a predetermined instruction from the user is accepted. In this case, the image display apparatus 100 is provided with a switchover button operated by the user or an instructed action evaluation section formed of a vibration sensor or an acceleration sensor and an evaluation circuit that detect the user's special knocking action. Displayed video images can be forcibly switched to an outside image captured with the camera CM in accordance with the user's intention by use of a trigger signal from the switching button or the instructed action evaluation section. Providing the switching button or the instructed action evaluation section as described above allows earlier display switching timing without relying on the outside light sensors S1 and S2 and readily assures the user on whom the image display apparatus 100 is mounted of recognition of the outside.

In the case where video images displayed by the first and second image displaying sections 101a, 101b are switched to an outside image captured with the camera CM, that is, in the case where the display mode is switched to the video see-through mode, image processing can be so performed on the outside image that the user readily recognize the outside. For example, the contour of an object in the displayed video images can be colored and hence enhanced. It is further possible to capture an image wider than the display region with the camera CM, measure the amount of rotary motion of the user's head from the time when the image is captured to the time when the image is displayed and determine the position in the captured image where the rotary motion of the user's head is detected, cut a displayed image in the determined position off the captured image, and display the cut image according to the current motion of the user's head. A method for cutting a displayed image off a captured image in accordance with the user's head rotary motion from the time when the image is captured to the time when the image is displayed can, for example, be the method described in JP-A-2007-213407. When the display mode is switched to the video see-through mode, carrying out the aforementioned process of reflecting the head motion during the period from the image capture to the image display allows reduction in the amount of discomfort felt by the user in the display switching even when the user sees an abrupt change in the outside.

In the above description, it is assumed that the color fading in the first light adjusting member 81 is a slow process. In a case where the color fading in the second light adjusting member 82 is also a slow process, displayed video images are provisionally switched to an outside image captured with the camera CM also in consideration of the response speed of the second light adjusting member 82.

In the image display apparatus 100 according to the third embodiment described above, in the case where the image display apparatus 100 is moved into a relatively dark environment, the image displaying sections 101*a* and 101*b* display the state of the outside obtained by the camera CM, which captures an image of the outside until the transmittance response of each of the first and second light adjusting members 81 and 82 is completed, whereby observation of the outside at the dark location is readily performed even in the case where the first light adjusting member 81 or the second light adjusting member 82 has a low response speed. Others The invention has been described with reference to the embodiments, but the invention is not limited to the embodiments described above, and the invention can be implemented in a variety of other aspects to the extent that they do not depart from the substance of the invention.

For example, in the embodiments described above, the first light adjusting member 81 and the second light adjusting member 82 are boned to and integrated with each other. The first light adjusting member 81 and the second light adjusting member 82 can instead be separately fixed to the main body 100*p* with the first light adjusting member 81 and the second light adjusting member 82 adjacent to each other. In this case, for example, the second light adjusting member 82 can be permanently fixed to the light guiding apparatus 30, and the first light adjusting member 81 can be detachably fixed to the main body 100*p*. In a case where only the non-electronically-controlled first light adjusting member 81, which does not allow active adjustment of the transmittance, is detached, the electronically-controlled second light adjusting member 82 is left, and the processes in step S107 in FIG. 7 and other steps are carried out on the assumption that the light adjusting shade has not been substantially detached (N in step S107). It is, however, noted that since the transmittance increases by the amount corresponding to the detached second light adjusting member 82, the set value of the threshold Lc and the contents of the filters A and C can be corrected. On the other hand, in a case where only the electronically-controlled second light adjusting member 82, which allows active adjustment of the transmittance, is detached, the processes in step S107 in FIG. 7 and other steps are carried out on the assumption that the light adjusting shade has been substantially detached (Y in step S107). Similarly, in a case where only the second light adjusting member 82 is attached, the process in step S101 in FIG. 7 is carried out on the assumption that the light adjusting shade has been substantially attached, but in a case where only the first light adjusting member 81 is attached, the process in step S101 in FIG. 7 is carried out on the assumption that the light adjusting shade has not been substantially attached.

For example, in the embodiments described above, the light adjustment state of the first light adjusting member 81 is changed based not on electronic control but in a self-reliant manner, and the light adjustment state of the second light adjusting member 82 can be changed based on electronic control, and the relationship described above can be reversed. That is, the light adjustment state of the outer first light adjusting member 81 can be changed based on electronic control, and the light adjustment state of the inner second light adjusting member 82 can be changed based not on electronic control but in a self-reliant manner. Still instead, the light adjustment state of both the first light adjusting member 81 and the second light adjusting member 82 can be changed based on electronic control.

The second light adjusting member 82 can be a device capable of switching a linearly polarizing element to a non-polarizing element and vice versa. Specifically, mechanically replacing a linearly polarizing plate with a non-polarizing transparent plate and vice versa allows the state of the outside light incident on the light guiding apparatus 30 via the first light adjusting member 81 to be switched between the linearly polarized state and the non-polarized state.

In the above description, the image displaying sections 101*a* and 101*b* each use the light guiding apparatus 30, but the image displaying sections 101*a* and 101*b* can each include a projection system formed, for example, of a mirror, a lens, and a half-silvered mirror.

Further, in the case where the light guiding system using the light guiding apparatus 30 is used and the case where a projection system formed of a mirror and a lens is used as described above, a reflection unit formed of a plurality of half-silvered mirrors, such as that described in JP-A-2017-3845, can be used to extract the video light to a position in front of the eyes. Further, the light adjusting shade 80 including the first and second light adjusting members and the circuits that control them in the embodiments described above can be added to an image display apparatus using a photoconductive optical element or substrate formed of a partial reflection surface array, such as that described in JP-A-2010-164988 or JP-A-2013-210633.

In the above description, the image displaying sections 101*a* and 101*b* each use the light guiding apparatus 30 but can be each replaced with a section that displays video images by two-dimensionally sweeping a laser beam or any other light beam.

In the above description, the light guiding apparatus 30, which forms a virtual image by using refraction surfaces and reflection surfaces, is used as each of the image displaying sections 101*a* and 101*b*, but not necessarily, and a diffraction surface or a hologram element can be used as each of the image displaying sections 101*a* and 101*b* to form a virtual image.

The second light adjusting member 82 is desirably so disposed as to cover at least the half-silvered mirror layers 15, each of which corresponds to the image extraction area A1. However, even in the case of an image display apparatus in which no half-silvered mirror layer 15 is provided in the light guiding apparatus 30, the second light adjusting member 82 is desirably so disposed as to cover regions from which image light is outputted to the user's eyes. Specifically, in the case of an image display apparatus in which a laser beam is two-dimensionally swept, a region which is part of each glasses-lens-shaped portion in front of an eye and where the laser beam is two-dimensionally swept is considered as the image extraction area, and the second light adjusting member 82 is so disposed as to cover the image extraction areas.

In the above description, the set of the display apparatus 100A and 100B are provided in correspondence with the right and left eyes as the image display apparatus 100, but only one of the right and left eyes may be provided with the display apparatus for monocular vision of an image.

The above description has been specifically made with reference to the case where the image display apparatus 100 according to any of the embodiments is a head mounted display, but the image display apparatus 100 according to any of the embodiments can be used in a head-up display, a binocular-shaped handheld display, and other apparatus.

The entire disclosure of Japanese Patent Application No. 2017-034472, filed Feb. 27, 2017 is expressly incorporated by reference herein.

What is claimed is:

1. An image display apparatus comprising:
    an image displaying section that presents a displayed image to a user and allows the user to visually recognize outside light;
    a first light adjusting member that is disposed on an outside-facing side of the image displaying section and adjusts transmittance based on outside light incident on the first light adjusting member; and
    a second light adjusting member that is disposed between the image displaying section and the first light adjusting member and adjusts transmittance in accordance with a transmission state of the first light adjusting member;
    wherein the transmittance of the second light adjusting member is controlled based on an output from an outside light sensor;
    the outside light sensor is covered with the first light adjusting member,
    the transmittance of the first light adjusting member changes in accordance with an outside light environment, and
    the transmittance of the second light adjusting member is controlled based on a numeral into which brightness of outside light having passed through the first light adjusting member is converted.

2. The image display apparatus according to claim 1, wherein the first light adjusting member is made of a photochromic material, and the transmittance of the first light adjusting member changes when the first light adjusting member receives UV light.

3. The image display apparatus according to claim 1, wherein the first light adjusting member is so disposed as to be adjacent to the second light adjusting member and on an outside-facing side of the second light adjusting member.

4. The image display apparatus according to claim 1, wherein the first light adjusting member and the second light adjusting member have transmittance adjustable ranges different from each other.

5. The image display apparatus according to claim 4, wherein the first light adjusting member is capable of adjusting the transmittance over a range wider than a range over which the second light adjusting member is capable of adjusting the transmittance.

6. The image display apparatus according to claim 1, wherein the transmittance of the second light adjusting member is controlled based on a signal for displaying an image to be displayed by the image displaying section.

7. The image display apparatus according to claim 1, further comprising a camera that captures an image of the outside and an outside light sensor that detects the outside light separately from the camera,
    wherein the outside light sensor and the camera are covered with the first light adjusting member.

8. The image display apparatus according to claim 1, further comprising a camera that captures an image of the outside and an outside light sensor that detects the outside light separately from the camera,
    wherein only the outside light sensor is covered with the first light adjusting member.

9. The image display apparatus according to claim 1, wherein the second light adjusting member is so disposed as to cover at least an image extraction area of the image displaying section.

10. The image display apparatus according to claim 9, wherein the second light adjusting member is integrated with the first light adjusting member.

11. The image display apparatus according to claim 10, wherein the first light adjusting member is made of a photochromic material, and the second light adjusting member is bonded to the first light adjusting member.

12. An image display apparatus comprising:
    an image displaying section that presents a displayed image to a user and allows the user to visually recognize outside light;
    a first light adjusting member that is disposed on an outside-facing side of the image displaying section and adjusts transmittance based on outside light incident on the first light adjusting member; and
    a second light adjusting member that is disposed between the image displaying section and the first light adjusting member and adjusts transmittance in accordance with a transmission state of the first light adjusting member;
    wherein in a case where the image display apparatus is moved into a relatively dark environment, the image displaying section displays a state of the outside obtained by a camera that captures an image of the outside until transmittance response of each of the first and second light adjusting members is completed.

13. The image display apparatus according to claim 1, wherein the light adjustment state of at least one of the first and second light adjusting members is allowed to be changed by electronic control, and
    a wiring line for the electronic control is provided at least along a region outside an image extraction area of the image displaying section.

14. The image display apparatus according to claim 13, wherein at least one of the first and second light adjusting members is fixed to an attachment section on a side where the image displaying section is present, and
    the attachment section has a connection section that connects at least one of the first and second light adjusting members to a control section for the electronic control via the wiring line.

15. The image display apparatus according to claim 13, wherein at least the first light adjusting member is so fixed to an attachment section on a side where the image displaying section is present as to entirely cover a field of view, and
    a connection section that connects the second light adjusting member to a control section for the electronic control via the wiring line is provided in a position of a frame section outside the image displaying section or a position around the frame section.

16. The image display apparatus according to claim 1, wherein the light adjustment state of at least one of the first and second light adjusting members is allowed to be changed by electronic control, and the light adjusting member capable of changing the light adjustment state is so set to have a high transmittance state when no drive signal is applied to the light adjusting member.

* * * * *